(12) United States Patent
Huang

(10) Patent No.: US 8,232,688 B2
(45) Date of Patent: Jul. 31, 2012

(54) VOICE COIL MOTOR TYPE FOCUSING ACTUATOR

(75) Inventor: Tien-Chung Huang, Chang Hwa (TW)

(73) Assignee: Tricore Corporation, Chang Hwa (TW)

( * ) Notice: Subject to any disclaimer, the term of this patent is extended or adjusted under 35 U.S.C. 154(b) by 126 days.

(21) Appl. No.: 12/912,014

(22) Filed: Oct. 26, 2010

(65) Prior Publication Data

US 2011/0038066 A1    Feb. 17, 2011

Related U.S. Application Data

(63) Continuation-in-part of application No. 11/806,869, filed on Jun. 5, 2007, now Pat. No. 7,893,568.

(51) Int. Cl.
*H02K 41/03* (2006.01)

(52) U.S. Cl. ............ 310/12.16; 310/13; 310/14

(58) Field of Classification Search .......... 310/13–15, 310/12.16, 12.24, 12.27, 12.33
See application file for complete search history.

(56) References Cited

U.S. PATENT DOCUMENTS

| 5,650,986 A * | 7/1997 | Lee et al. ............ 369/44.14 |
| 2006/0214520 A1 * | 9/2006 | Tseng ............ 310/14 |
| 2007/0108847 A1 * | 5/2007 | Chang ............ 310/12 |
| 2007/0133110 A1 * | 6/2007 | Huang ............ 359/824 |
| 2007/0159010 A1 * | 7/2007 | Su et al. ............ 310/14 |

* cited by examiner

*Primary Examiner* — Thanh Lam
(74) *Attorney, Agent, or Firm* — Bacon & Thomas, PLLC

(57) ABSTRACT

A voice coil motor type focusing actuator is disclosed to have a fixed unit, a movable unit and two resilient holding members. The fixed unit has a bracket with two slide shafts and a plurality of magnets mounted in the bracket. The movable unit has a lens holder movably mounted inside the bracket and a coil wound around the lens holder. The lens holder has two lugs. Each lug has a through hole for the slide shaft of the fixed unit to insert thereinto. The resilient holding member is fastened between the bracket of the fixed unit and the lens holder of the movable unit. When a current is supplied to the coil, a magnetic force is produced between the coil and the magnets to move the movable unit. When the current stops, an elastic force due to the resilient holding unit is utilized to pull the movable unit back to its original position.

7 Claims, 8 Drawing Sheets

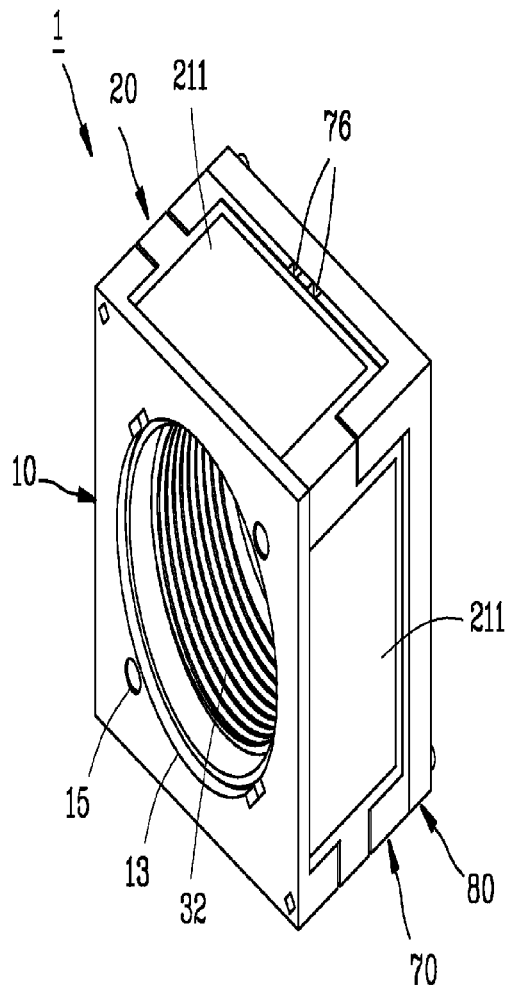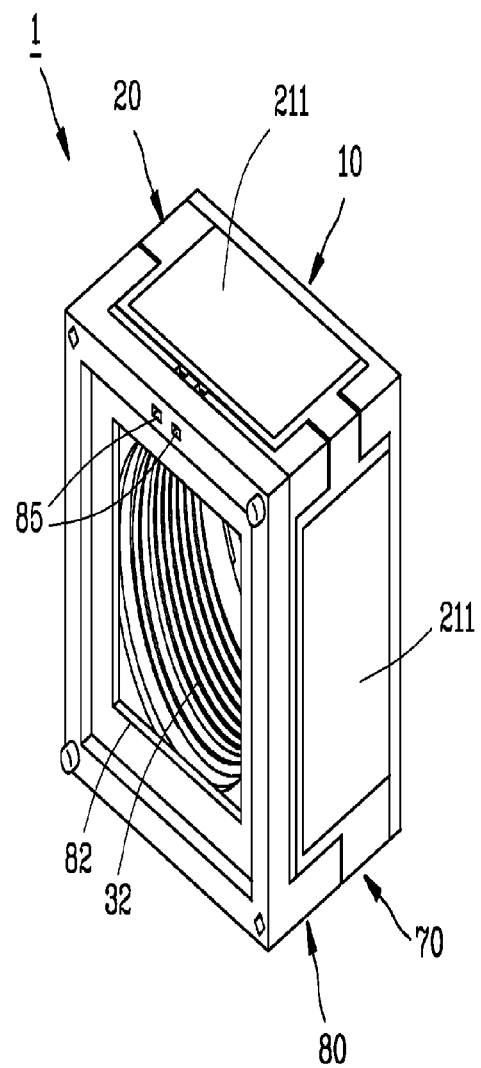
FIG.1
FIG.2

VOICE COIL MOTOR TYPE FOCUSING ACTUATOR

CROSS REFERENCE TO RELATED APPLICATIONS

The present application is a continuation-in-part of U.S. patent application Ser. No. 11/806,869, entitled "VOICE COIL MOTOR TYPE FOCUSING ACTUATOR", filed on Jun. 5, 2007, which is incorporated herein by reference.

BACKGROUND OF THE INVENTION

1. Field of the Invention

The present invention relates to a voice coil motor and more particularly, to a voice coil motor type focusing actuator.

2. Description of the Related Art

A conventional voice coil motor type focusing actuator essentially comprises a bracket and a lens holder movably mounted in the bracket. A conventional voice coil motor type focusing actuator has a complicated structure, resulting in a complicated installation procedure. Further, improper connection between parts causes instability of structure. Further, these conventional voice coil motor type focusing actuators cannot provide a good magnetic effect.

Therefore, it is desirable to provide a voice coil motor type focusing actuator that solves the aforesaid problems.

SUMMARY OF THE INVENTION

The present invention has been accomplished under the circumstances in view. It is one object of the present invention to provide an actuator, which has a bracket manufactured from a plastic inject molding process containing wrapping four separate metal plates with a plastic material, therefore enhances the structure strength of the bracket and simplifies the assembling process.

It is another object of the present invention to provide an actuator, which provides a lens holder with two through holes and a bracket with two slide shafts inserting into the through holes, simplifying the assembling between the bracket and the lens holder and smoothening the moving of the lens holder.

To achieve these and other objects of the present invention, the voice coil motor type focusing actuator comprises a fixed unit, a movable unit and two resilient holding members. The fixed unit comprises a bracket which is manufactured from a plastic inject molding process containing wrapping four separate metal plates with a plastic material, and a plurality of magnets mounted in the bracket at a plurality of sides. The movable unit comprises a lens holder movably mounted inside the bracket and a coil wound around the lens holder corresponding to the magnets. The resilient holding members are connected between the fixed unit and the movable unit.

In one embodiment of the present invention, the bracket has a receiving chamber and two slide shafts respectively positioned on two sides of the receiving chamber. The lens holder has two lugs, each lug having a through hole for the slide shaft of the fixed unit to insert thereinto. The resilient holding member has an outer frame fastened on the bracket of the fixed unit, an inner frame fastened on the lens holder of the movable unit, and an electric conducting portion. The outer frame of the resilient member has at least one first connecting hole and the inner frame of the resilient member has at least one second connecting hole. The bracket of the fixed unit has at least two first connecting pins inserting into the first connecting holes of the resilient holding members. The lens holder of the movable unit has at least two second connecting pins inserting into the second connecting holes of the resilient holding members. The outer frame of the resilient holding member is composed of three metal stick portions. Each metal stick portion perpendicularly connects with another adjacent metal stick portion. The bracket has a plurality of insulating ribs extending along the metal stick portions of the outer frames of the resilient holding members, and a gap between two of the insulating ribs for the electric conducting portion to insert therethrough. The bracket of the fixed unit has two stopping surfaces on two opposite angles of the bracket, the slide shafts extending from the stopping surfaces.

BRIEF DESCRIPTION OF THE DRAWINGS

FIG. 1 is a perspective view of an actuator according to a first preferred embodiment of the present invention.

FIG. 2 is another perspective view of an actuator according to the first preferred embodiment of the present invention.

DETAILED DESCRIPTION OF THE INVENTION

Figure 3:
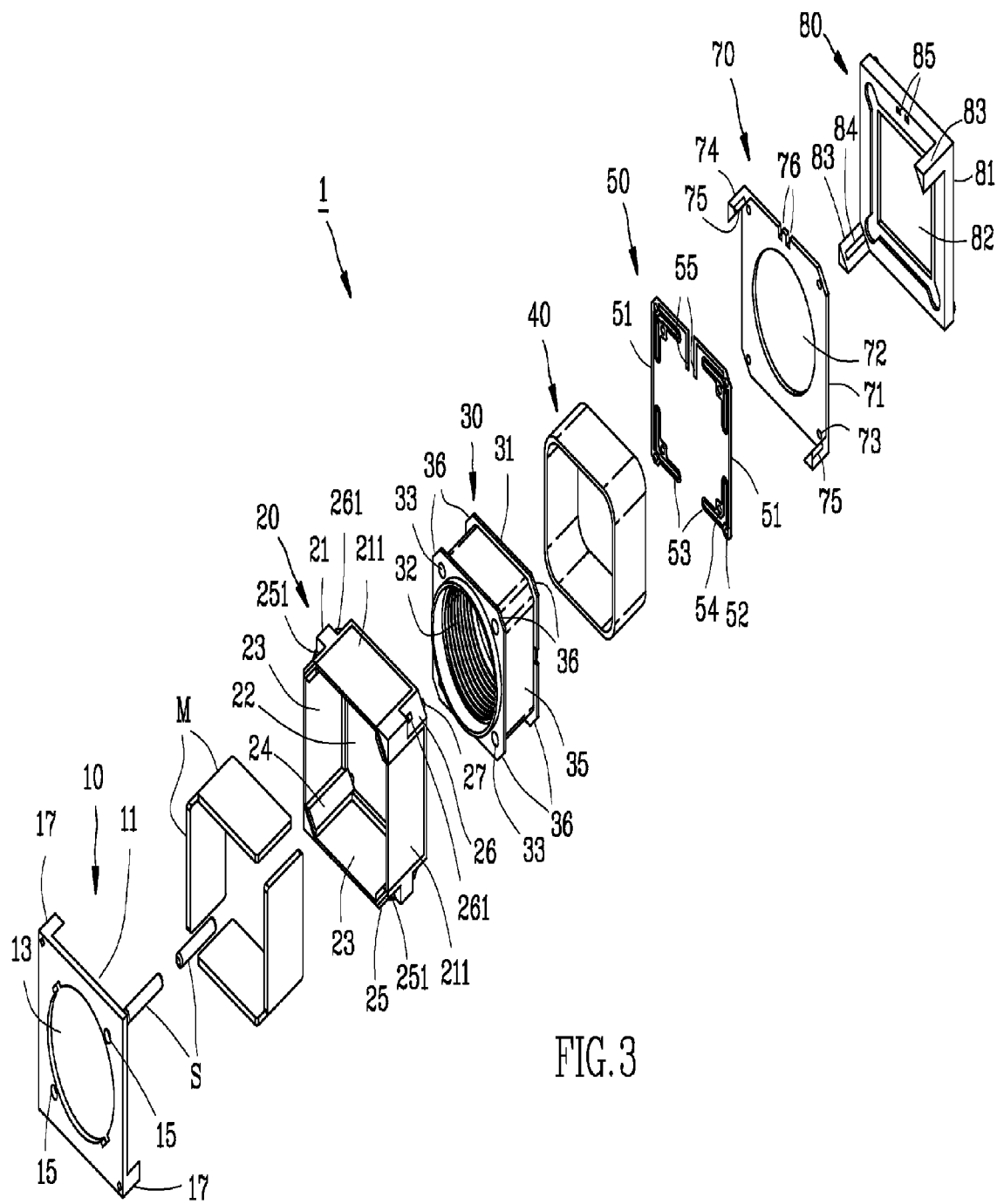
FIG. 3 is an exploded view of the actuator according to the first preferred embodiment of the present invention.
Figure 4:
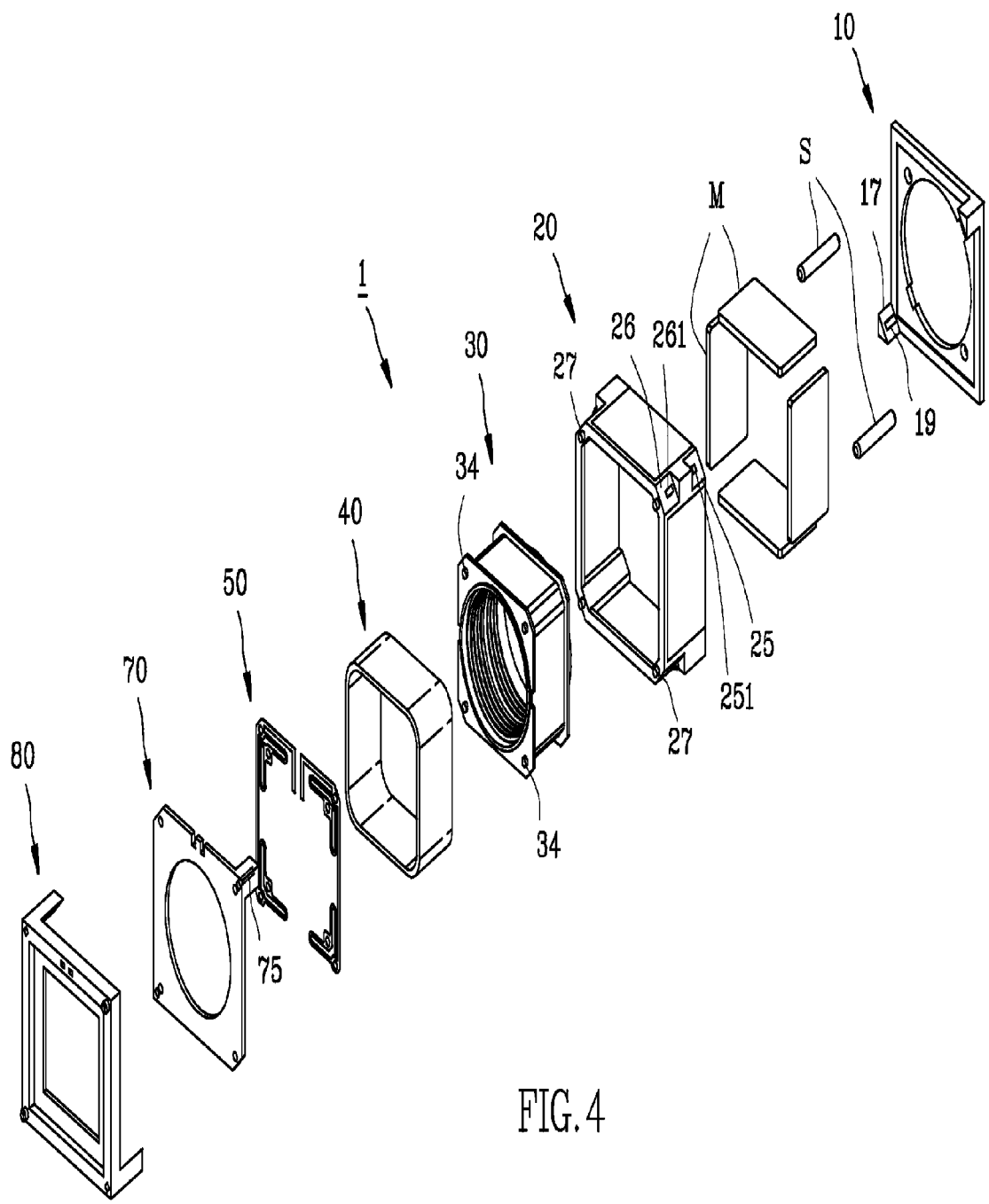
FIG. 4 is another exploded view of the actuator according to the first preferred embodiment of the present invention.
Figure 5:
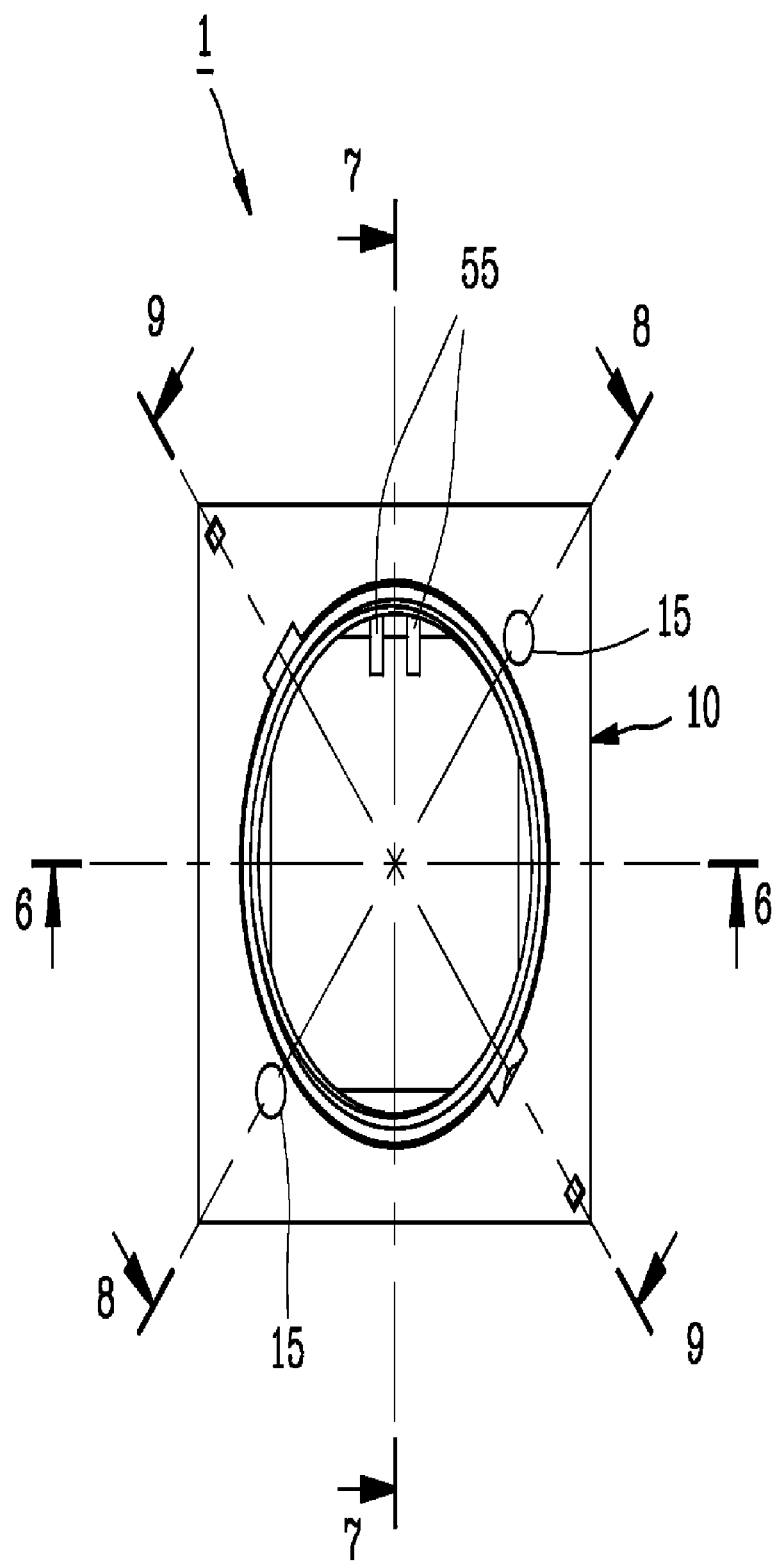
FIG. 5 is a top view of the actuator according to the first preferred embodiment of the present invention.
Figure 6:
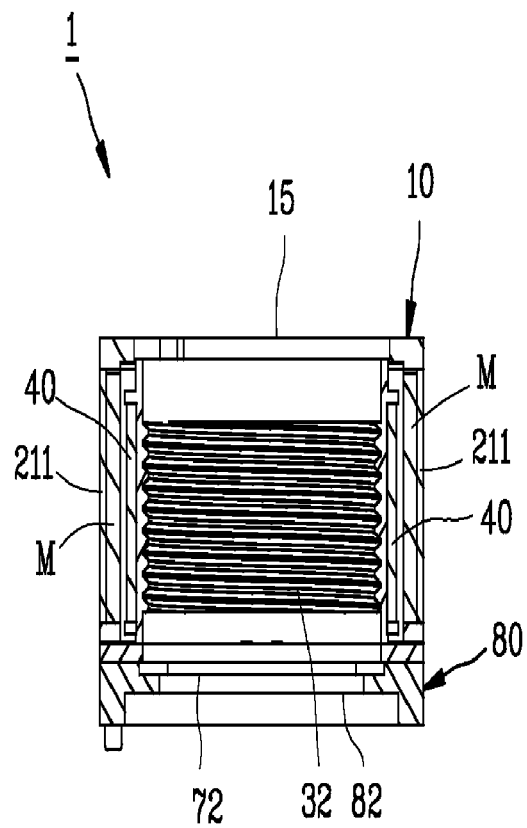
FIG. 6 is a sectional view taken along line 6-6 of FIG. 5.
Figure 7:
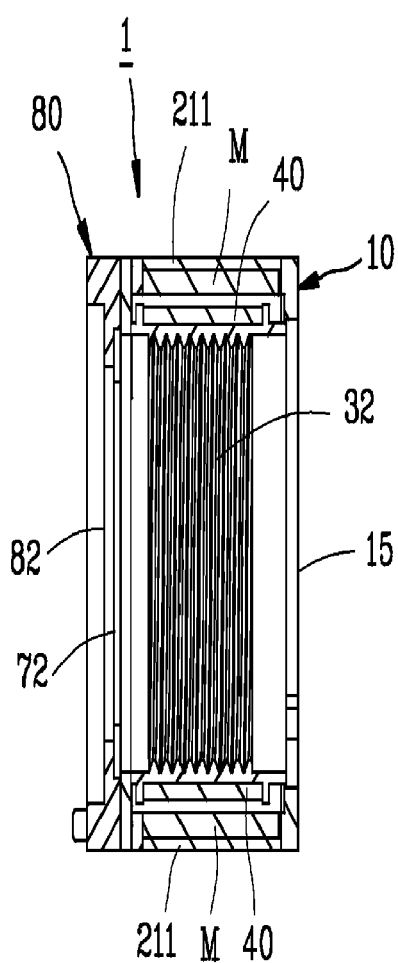
FIG. 7 is a sectional view taken along line 7-7 of FIG. 5.
Figure 8:
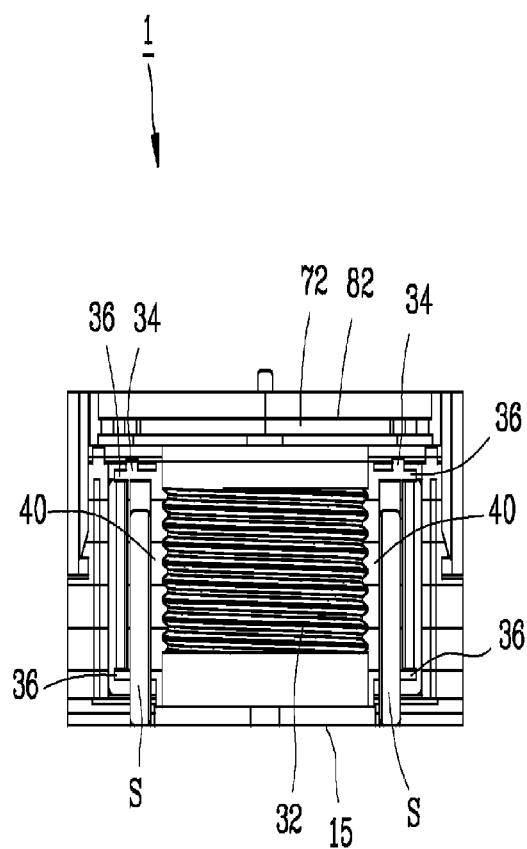
FIG. 8 is a sectional view taken along line 8-8 of FIG. 5.
Figure 9:
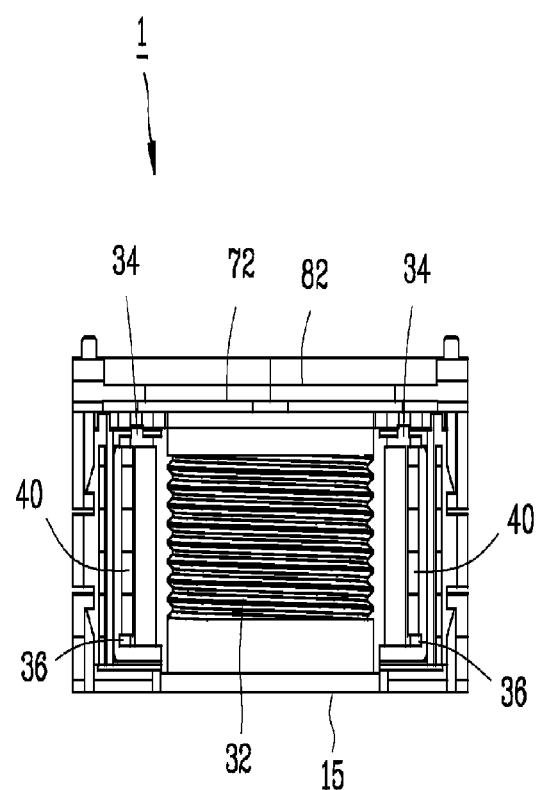
FIG. 9 is a sectional view taken along line 9-9 of FIG. 5.

Referring to FIGS. 1-9, a voice coil motor type focusing actuator in accordance with a first embodiment of the present invention is shown, which comprises a first cover 10, a bracket 20, four magnets M, a lens holder 30, a coil 40, two resilient holding members 50, a second cover 70, and a sensor carrier 80.

The first cover 10 comprises a bottom panel 11, an escape hole 13 cut through the center of the bottom panel 11, two guiding holes 15 and two opposite first conjunction legs 17 perpendicularly extend from two opposite angles of the bottom panel 11. Each first conjunction leg 17 has a locking socket 19.

The bracket 20 comprises a frame body 21 mounted on the first cover 10, an accommodation receiving chamber 22 defined in the frame body 21, four magnet mounting grooves 23 formed in four sides of the frame body 21, four rectilinear sliding portions 24 formed in the frame body 21, two first conjunction chamfers 25 sinking from two opposite angles of the frame body 21, two locking blocks 251 formed on the first conjunction chamfer 25 and engaging with the locking socket 19 of the first cover 10, four second conjunction chamfers 26 sinking from four another angles of the frame body 21, four locking blocks 261 each formed on the second conjunction chamfer 26, and four locating pins 27 protruded from one side of the frame body 21. The frame body 21 is manufactured from a plastic inject molding process containing wrapping four separate metal plates 211 with a plastic material.

The magnets M are respectively mounted in the magnet mounting grooves 23 of the bracket 20. Further, the bracket 20 and the magnets M constitute a fixed unit.

The lens holder 30 comprises a holder shell 31 accommodated in the accommodation receiving chamber 22 of the bracket 20, a lens receiving means, for example, a screw hole 32, formed in the holder shell 31 for receiving a lens (not shown), four guiding holes 33, four connecting bolts 34 protruded from one side of the holder shell 31, a winding portion 35, and eight rectilinear sliding portions 36 disposed on the outside of the holder shell 31 and respectively coupled to the rectilinear sliding portions 24 of the bracket 20.

The two guiding posts S is provided to pass through the guiding holes 15,33 of the first cover 10 and lens holder 30. The guiding posts S are further fixed to the first cover 10.

The coil 40 is wound around the winding portion 35 of the lens holder 30 and corresponds with the magnets M. Further, the lens holder 30 and the coil 40 constitute a movable unit.

The two resilient holding members 50 each comprises an outer frame 51 fastened on the bracket 20, an inner frame 53 fastened on the lens holder 30, and an electric conducting portion 55. The outer frame 51 has two first connecting holes 52 for the locating pins 27 of the bracket 20 to insert thereinto, and the inner frame 53 has two second connecting holes 54 for the connecting bolts 34 of the lens holder 30 to insert thereinto.

The second cover 70 comprises a body 71 mounted on the bracket 20, an escape hole 72 corresponding to the screw hole 32 of the lens holder 30, four locating holes 73 respectively for the locating pins 27 of the bracket 20 to insert thereinto, two second conjunction legs 74 perpendicularly extend from the two opposite angels of the body 71, and two notches 76 for receiving the electric conducting portions 55. Each second conjunction leg 74 has a locking socket 75 for engagement of one locking block 261 of the bracket 20.

The sensor carrier 80 is covered on the second cover 70, comprising a body 81 for holding an image sensor (not shown), an escape hole 82 corresponding to the escape hole 72 of the second cover 70, two third conjunction legs 83 perpendicularly extend from the two opposite angles of the body 81, and two holes 85 corresponding to the two notches 76 of the second cover 70 for receiving of the electric conducting portion 55. Each third conjunction leg 83 has a locking socket 84 for engagement of another locking block 261 of the bracket 20.

Further, the first cover 10, the second cover 70 and even the sensor carrier 80 constitute a carrier unit.

When a current is supplied to the coil 40, an electromagnetic force is generated between the coil 40 and the magnets M to move the movable unit with the lens (not shown) along the two guiding posts S. When the current stops, an elastic force due to the resilient holding members 50 is utilized to pull the lens holder 30 back to its original position.

Figure 10:
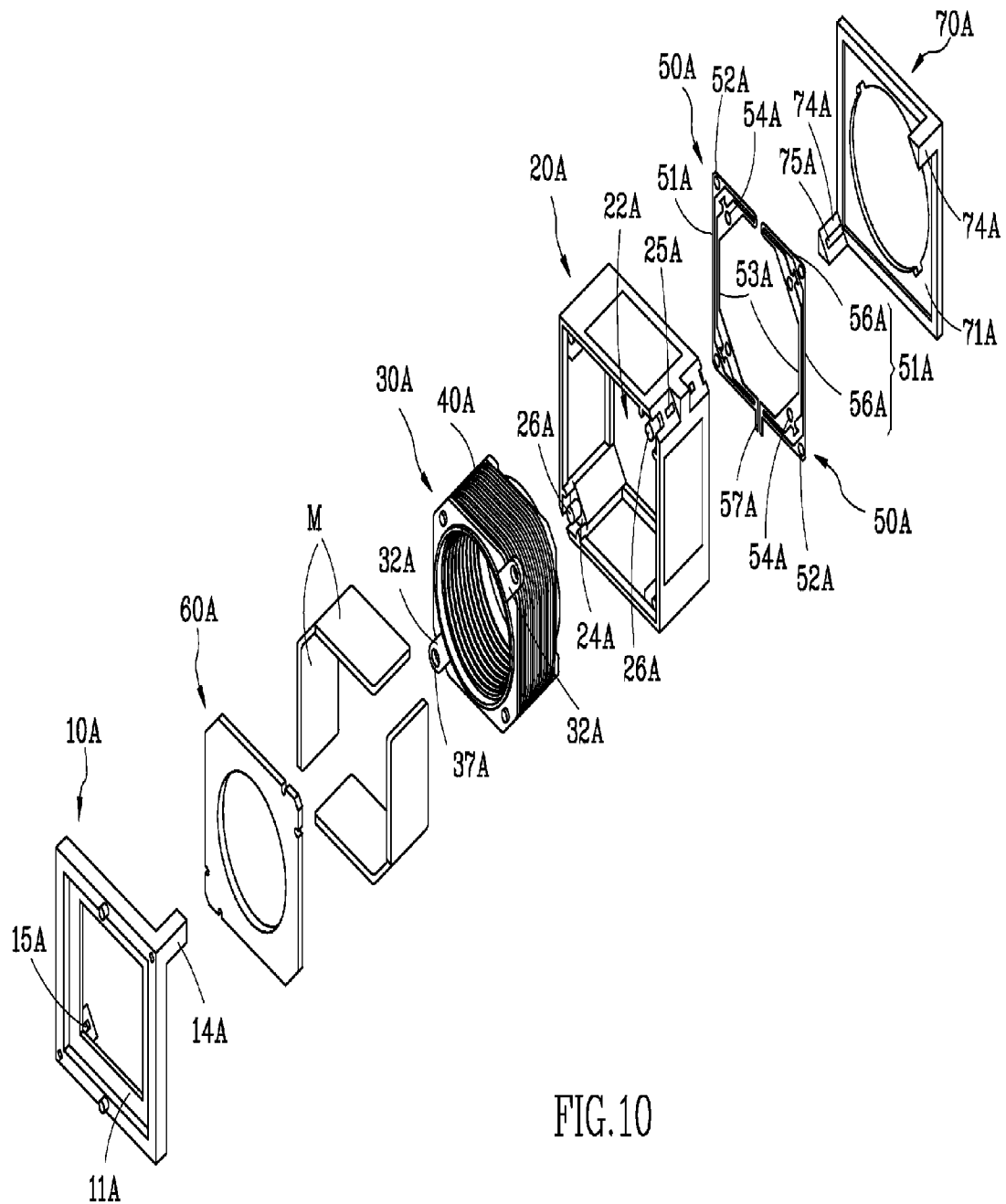
FIG. 10 is an exploded view of an actuator according to a second preferred embodiment of the present invention.
Figure 11:
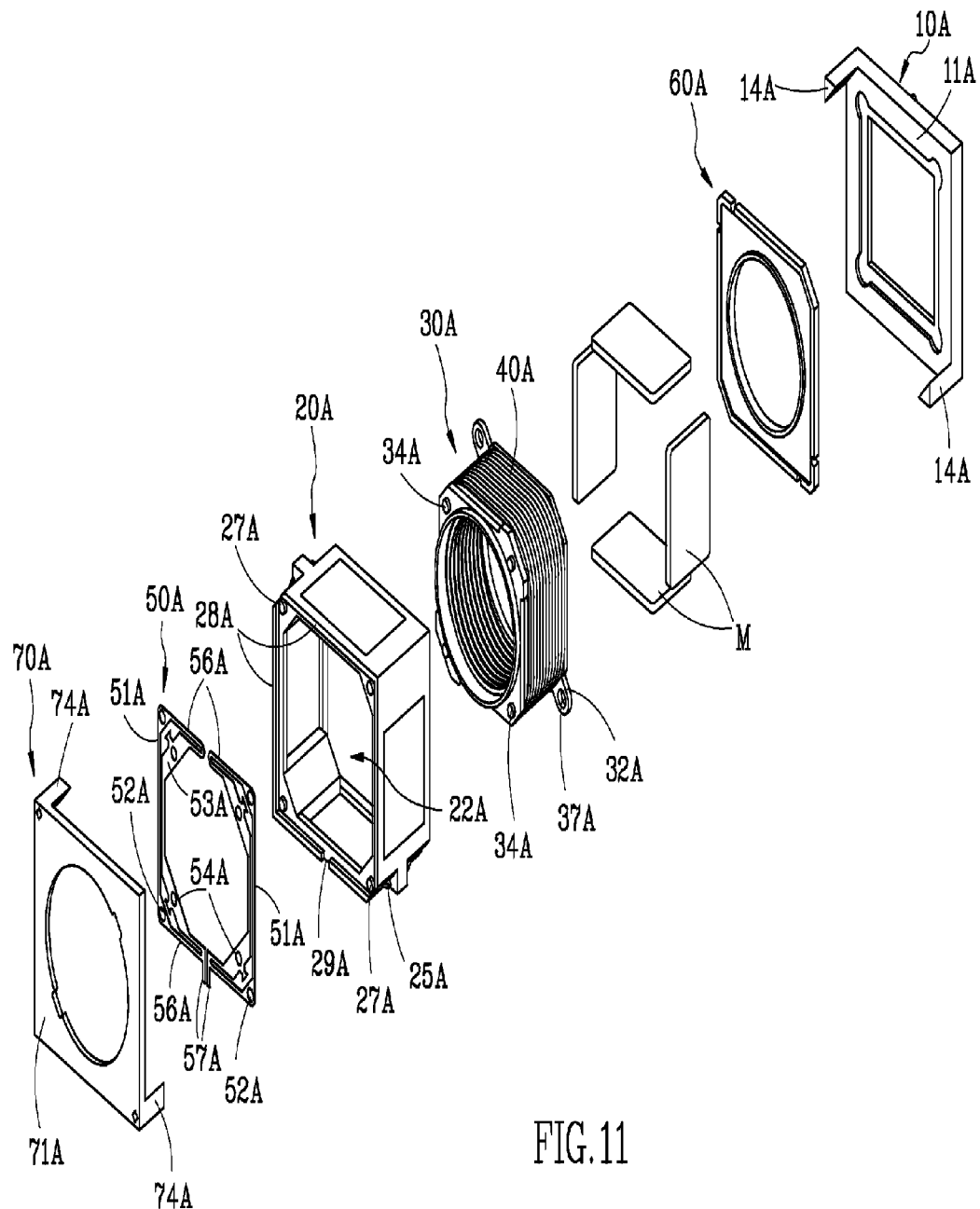
FIG. 11 is another exploded view of an actuator according to the second preferred embodiment of the present invention.

FIGS. 10-11 show an actuator in accordance with a second embodiment of the present invention, comprising a first cover 10A, a bracket 20A, four magnets M, a lens holder 30A, a coil 40A, two resilient holding members 50A, a stopping member 60A and a second cover 70A.

The bracket 20A has a receiving chamber 22A for accommodating the lens holder 30A, two stopping surface 24A formed on two opposite angles of the bracket 20A, two slide shafts 26A respectively positioned on two sides of the chamber 22A and extending from the stopping surface 24A, and four wedge-shaped locking bumps 25A. The lens holder 30A has two lugs 32A, each lug 32A having a through hole 37A for the slide shafts 26A of the bracket 20A to insert thereinto. It is helpful to simplify the assembling between the bracket 20A and the lens holder 30A. Each resilient holding member 50A has an outer frame 51A fastened on the bracket 20A, an inner frame 53A fastened on the lens holder 30A, and an electric conducting portion 57A. The bracket 20A has four first connecting pins 27A inserting into first connecting holes 52A of the outer frames MA, and the lens holder 30A has four second connecting pins 34A inserting into second connecting holes 54A MA of the inner frames 53A. The outer frames MA of the resilient holding member 50A is composed of three metal stick portions 56A, each metal stick portion 56A perpendicularly connecting with another adjacent metal stick portions 56A. The bracket 20A further comprises a plurality of insulating ribs 28A extending along the metal stick portions 56A. A gap 29A is formed between two of the insulating ribs 28A for the electric conducting portions 57A to pass through. The stopping member 60A is mounted between the bracket 20A and the first cover 10A. The first cover 10A and second cover 70A each has a bottom panel 11A,71A and two conjunction legs 14A,74A extending from the bottom panel 11A,71A. The conjunction legs 14A,74A each has a locking socket 15A,75A for engaging with the wedge-shaped locking bump 25A of the bracket 20A.

As indicated above, the invention provides a voice coil motor type focusing actuator, which has the following benefits:

1. The bracket of the fixed unit is manufactured from a plastic inject molding process containing wrapping four separate metal plates with a plastic material. It enhances the structure strength of the bracket and simplifies the assembling process.

2. The rectilinear motion of the movable unit relative to the fixed unit is achieved by the slide shafts of the bracket and the through holes of the lens holder. It is helpful to simplify the assembling between the bracket and the lens holder and smoothen the moving of the movable unit.

What is claimed is:

1. A voice coil motor type focusing actuator comprising:
 a fixed unit having a bracket and a plurality of magnets mounted in the bracket, the bracket having a receiving chamber and two slide shafts respectively positioned on two sides of the receiving chamber;
 a movable unit having a lens holder movably mounted in the receiving chamber of the fixed unit, and a coil wound around the lens holder, the lens holder having two lugs, each lug having a through hole for the slide shaft of the fixed unit to insert thereinto; and
 two resilient holding members, each resilient holding member having an outer frame fastened on the bracket of the fixed unit, and an inner frame fastened on the lens holder of the movable unit.

2. The actuator as claimed in claim 1, wherein the outer frame of the resilient member has at least one first connecting hole and the inner frame of the resilient member has at least one second connecting hole, the bracket of the fixed unit having at least two first connecting pins inserting into the first connecting holes of the resilient holding members, the lens holder of the movable unit having at least two second connecting pins inserting into the second connecting holes of the resilient holding members.

3. The actuator as claimed in claim 2, wherein the outer frame of the resilient holding member is composed of three metal stick portions, each metal stick portion perpendicularly connecting with another adjacent metal stick portion.

4. The actuator as claimed in claim 3, wherein the bracket has a plurality of insulating ribs extending along the metal stick portions of the outer frames of the resilient holding members.

5. The actuator as claimed in claim 4, wherein the bracket has a gap between two of the insulating ribs, the resilient holding member each further comprising an electric conducting portion inserting through the gap.

6. The actuator as claimed in claim 1, wherein the bracket of the fixed unit has two stopping surfaces on two opposite angles of the bracket, the slide shafts extending from the stopping surfaces.

7. The actuator as claimed in claim 1, further comprising two covers respectively mounted on two sides of the fixed unit, each cover having a bottom panel and two conjunction legs extending from the bottom panel, the conjunction leg each having a locking socket, the bracket of the fixed unit having four wedge-shaped locking bumps inserting into the locking sockets of the covers.

* * * * *